US012238831B2

(12) United States Patent
Xu et al.

(10) Patent No.: US 12,238,831 B2
(45) Date of Patent: Feb. 25, 2025

(54) LIGHTING APPARATUS

(71) Applicant: LEEDARSON LIGHTING CO.,LTD., Fujian (CN)

(72) Inventors: Yangbin Xu, Fujian (CN); Yankun Li, Fujian (CN); Hemu Ye, Fujian (CN); Qiqiang Lin, Fujian (CN); Zongyuan Liu, Fujian (CN)

(73) Assignee: LEEDARSON LIGHTING CO.,LTD., Fujian (CN)

( * ) Notice: Subject to any disclaimer, the term of this patent is extended or adjusted under 35 U.S.C. 154(b) by 102 days.

(21) Appl. No.: 18/226,722

(22) Filed: Jul. 26, 2023

(65) Prior Publication Data

US 2024/0040681 A1 Feb. 1, 2024

(30) Foreign Application Priority Data

Jul. 26, 2022 (CN) ........................ 202221945218.0

(51) Int. Cl.
*H05B 45/20* (2020.01)
*H05B 45/34* (2020.01)

(52) U.S. Cl.
CPC ............ *H05B 45/20* (2020.01); *H05B 45/34* (2020.01)

(58) Field of Classification Search
None
See application file for complete search history.

(56) References Cited

FOREIGN PATENT DOCUMENTS

CN 108966425 A * 12/2018 ......... H05B 33/0809

* cited by examiner

*Primary Examiner* — Henry Luong
(74) *Attorney, Agent, or Firm* — Chun-Ming Shih; LANWAY IPR SERVICES

(57) ABSTRACT

A lighting apparatus includes a light source plate, LED modules and a driver module. The light source plate includes a substrate layer, a wiring layer and a protection layer. The substrate layer is made of metal material. LED modules are disposed on a top side of the light source plate. The driver module is disposed on the top side of the light source plate. The LED modules and the driver module are electrically connected via the wiring layer. The driver module includes an AC-DC converter, a regulator, a controller, a current source and an oscillation wave removal circuit. The controller controls the current source to generate driving currents to the LED modules. The oscillation wave removal circuit is coupled to the AC-DC converter for suppressing a sudden abnormal peak voltage from the AC-DC converter.

20 Claims, 13 Drawing Sheets

LIGHTING APPARATUS

FIELD

The present invention is related to a lighting apparatus, and more particularly related to a lighting apparatus with compact driver design.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

There are various LED light devices. Each meets certain requirement and brings some advantages.

DoB, Device on Board, is a type for designing a light source with LED devices. In such type, multiple components are integrated on the same plate, which may dramatically lower down the cost and design complexity.

However, it is found that there are many technical details that can be improved to make such device more useful while keeping low cost and compact design. There are various LED light devices. Each meets certain requirement and brings some advantages.

SUMMARY

In some embodiments, a lighting apparatus includes a light source plate, LED modules and a driver module.

The light source plate includes a substrate layer, a wiring layer and a protection layer.

The substrate layer is made of metal material, e.g. zinc or aluminum alloy.

A thickness of substrate layer is larger than ten times a total thickness of the wiring layer and the protection layer.

LED modules are disposed on a top side of the light source plate.

The driver module is disposed on the top side of the light source plate.

Specifically, the LED modules and the driver module are placed on the same light source plate.

The LED modules and the driver module are electrically connected via the wiring layer.

The driver module includes an AC-DC converter, a regulator, a controller, a current source and an oscillation wave removal circuit.

The controller controls the current source to generate driving currents to the LED modules.

The oscillation wave removal circuit is coupled to the AC-DC converter for suppressing a sudden abnormal peak voltage from the AC-DC converter.

In some embodiments, the sudden abnormal peak voltage is an oscillation wave caused by a leakage current from the substrate layer.

In some embodiments, the substrate layer is used as a ground for coupling to the driver module.

In some embodiments, the oscillation wave removal includes multiple wave filters coupled in parallel.

In some embodiments, at least two of the wave filters are assigned to filter different wave segments.

In some embodiments, at least one of the wave filter is composed of a resistor, a capacitor and a transient voltage suppressor.

In some embodiments, at least one of the wave filter is composed of a resistor, a capacitor, a diode and a transient voltage suppressor.

In some embodiments, wherein the transient voltage suppressor comprises a p-n junction heavily doped to achieve a desired low breakdown voltage lower than 10 V so that the concentration of dopant atoms in the p and n regions is intentionally increased resulting in a thinner depletion region at the p-n junction.

In some embodiments, when a transient voltage spike occurs and the voltage across the transient voltage suppressor exceeds a breakdown voltage, the transient voltage suppressor enters the breakdown region, and its resistance drops significantly In some embodiments, the transient voltage suppressor enters the breakeven region less than 1 ms.

In some embodiments, the lighting apparatus may also include a ripping suppressor.

The ripping suppressor is coupled to an output of the current source to remove a ripping wave in the driving currents supplied to the LED modules.

In some embodiments, the controller waits for a predetermined period every time when the driver module is initialized before adjusting a mixed color temperature of the LED modules.

In some embodiments, the controller selectively enables the oscillation wave removal circuit.

In some embodiments, abnormal statistics of the sudden abnormal voltage peak is recorded by the controller for dynamically generating a removal schedule for enabling the oscillation wave removal circuit by analyzing the recorded abnormal statistics.

In some embodiments, the driver module is placed in a central area of the light source plate.

The multiple LED modules are placed in peripheral areas of the light source plate.

In some embodiments, two power wires are coupled to the AC-DC converter for providing an AC power source.

In some embodiments, a phase angle between the two power wires are 90 degrees.

In some embodiments, a phase angle between the two power wires are 270 degrees.

In some embodiments, the substrate layer is connected to an earth protective terminal.

A phase angle between the earth protective terminal and one of the power wire is 90 degrees.

In some embodiments, the current source is a linear current regulator.

There is a path for conducting heat of the current source to the substrate layer.

DETAILED DESCRIPTION

Figure 11:
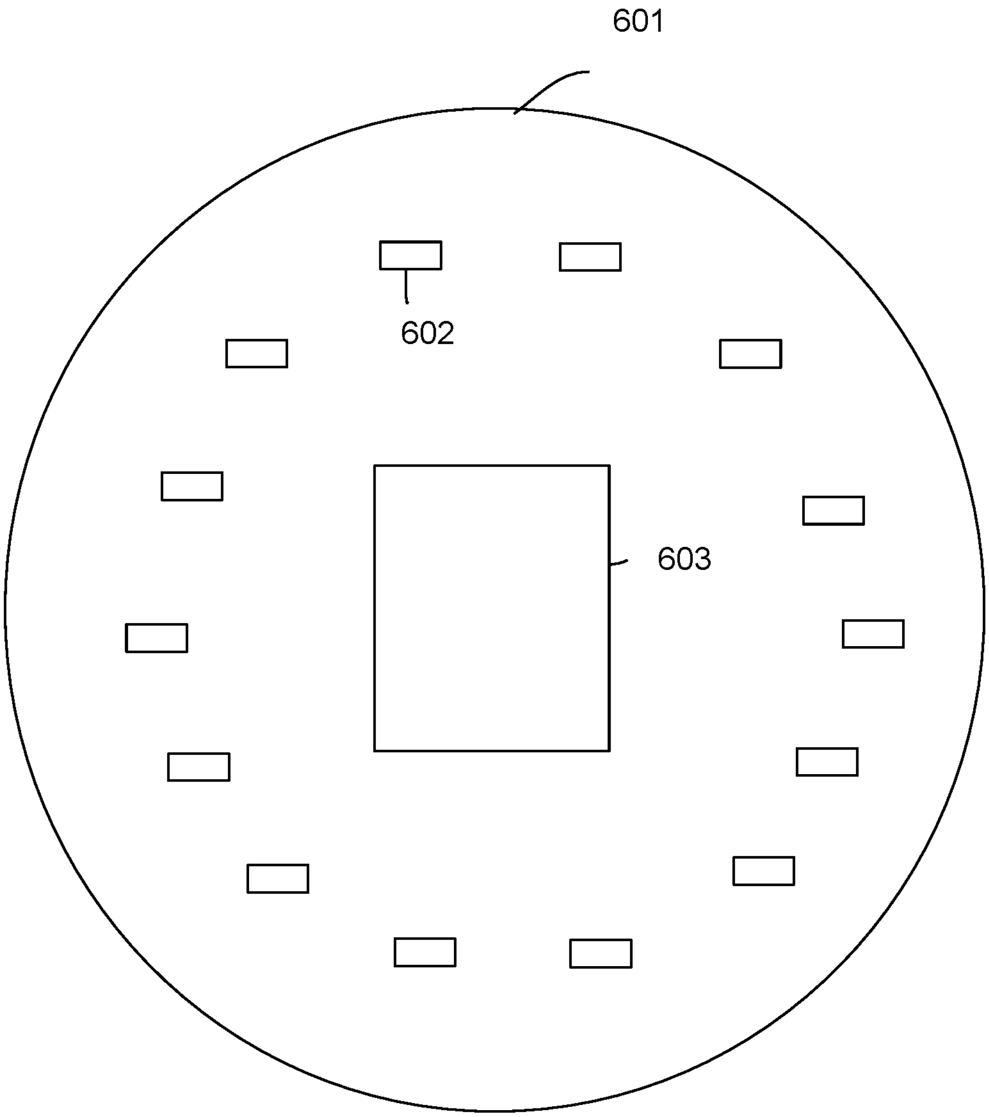
FIG. 11 illustrates a lighting apparatus embodiment.

In FIG. 11, a lighting apparatus includes a light source plate 601, LED modules 602 and a driver module 603.

The multiple LED modules 602 may include multiple types of LED modules. These LED modules may include multiple types of LED modules, each type with a different light parameter, e.g. color temperature, color, color rendering index. Each LED module may include a lens, a LED chip, a fluorescent layer covering the LED chip or have other configuration, e.g. a light strip style light source. In some other embodiments, these LED modules may be the same.

Figure 12:
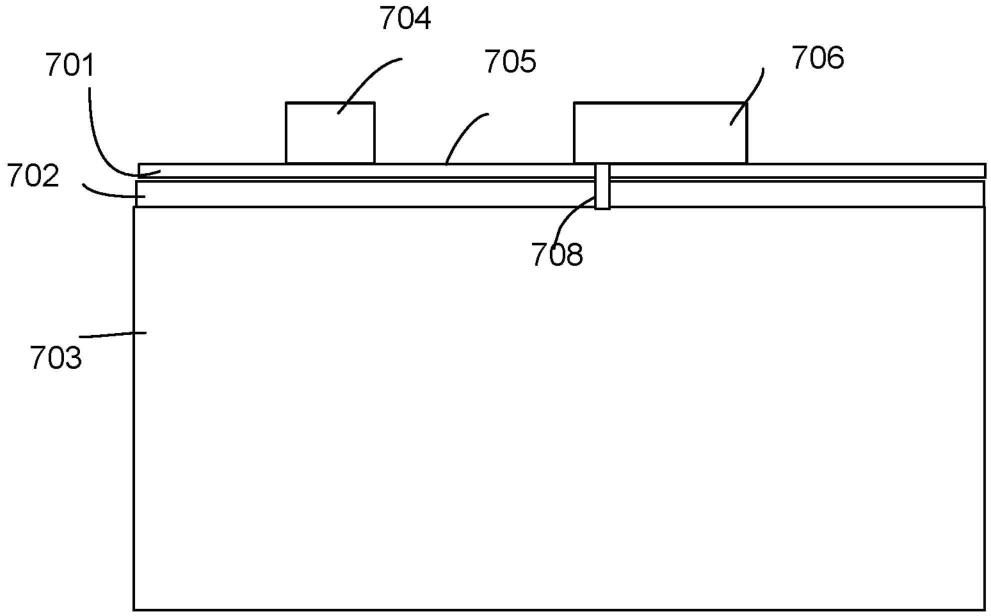
FIG. 12 is a sectional view for illustrating components on a DoB design circuit board used in a lighting apparatus embodiment.

FIG. 12 illustrates a sectional view of a light source plate. In FIG. 12, the light source plate includes a substrate layer 703, a wiring layer 702 and a protection layer 701. The wire layer 702 may include patterned wires for electrically connecting components, e.g. LED modules to driver components.

The substrate layer 703 is made of metal material, e.g. zinc or aluminum alloy.

A thickness of substrate layer 703 is larger than ten times a total thickness of the wiring layer 702 and the protection layer 701. In some embodiments, there is an additional insulation layer between the wiring layer 702 and the substrate layer 703.

In FIG. 12, the LED modules 704 are disposed on a top side 705 of the light source plate.

The driver module 706 is also disposed on the top side 705 of the light source plate.

Specifically, the LED modules 704 and the driver module 705 are placed on the same light source plate.

The LED modules 704 and the driver module 706 are electrically connected via the wiring layer 702.

The driver module includes an AC-DC converter 801, a regulator 802, a controller 804, a current source 803 and an oscillation wave removal circuit 805.

The controller 804 controls the current source 803 to generate driving currents to the LED modules 805.

The oscillation wave removal circuit 805 is coupled to the AC-DC converter 801 for suppressing a sudden abnormal peak voltage from the AC-DC converter 801.

For example, under experiments, it is found that there are often ringing signals caused by the structure of the DoB (Device on Board) design if a metal plate is used for holding the driver circuits and the LED modules. Such ringing signals has some types of oscillation cycles and may cause component damages or affect light output patterns.

In some embodiments, the sudden abnormal peak voltage is an oscillation wave caused by a leakage current from the substrate layer.

In some embodiments, the substrate layer is used as a ground for coupling to the driver module. Ground, in the context of electrical and electronic systems, refers to a reference point or a conducting connection that serves as a common return path for electric currents. One of the primary reasons for connecting an LED light device to ground is safety. In the event of a fault or short circuit in the device, excess current may flow to the ground, providing a low-resistance path for the current to dissipate. This can prevent electric shocks to users and protect the device from damage.

Ground may also serve as the common reference point for voltages in the circuit. All voltage measurements are taken with respect to ground. Without a well-defined ground, it would be challenging to make accurate voltage measurements and maintain consistent circuit behavior.

Grounding may also help protect electronic components from Electrostatic Discharge (ESD). When someone touches an electronic device, static electricity can build up in their body. If they touch a sensitive component, the discharge could damage or destroy it. Grounding provides a path for this static charge to safely dissipate, protecting the components.

In addition, more and more light devices are integrated with connection capability. In wireless connection, antenna is a critical component. Grounding is essential and helpful in antenna design for electronic devices. Grounding plays a significant role in the proper functioning and performance of antennas.

The ringing effect in an LED light device refers to an undesired phenomenon where the LED's brightness exhibits rapid fluctuations, often appearing as flickering, pulsating, or visible rings or ripples around the light source. This effect can be particularly noticeable when the LED is dimmed or operated at low light levels. The ringing effect can create an uncomfortable lighting experience and may even lead to health concerns for some individuals, as flickering light can cause eye strain and headaches.

Figure 1:
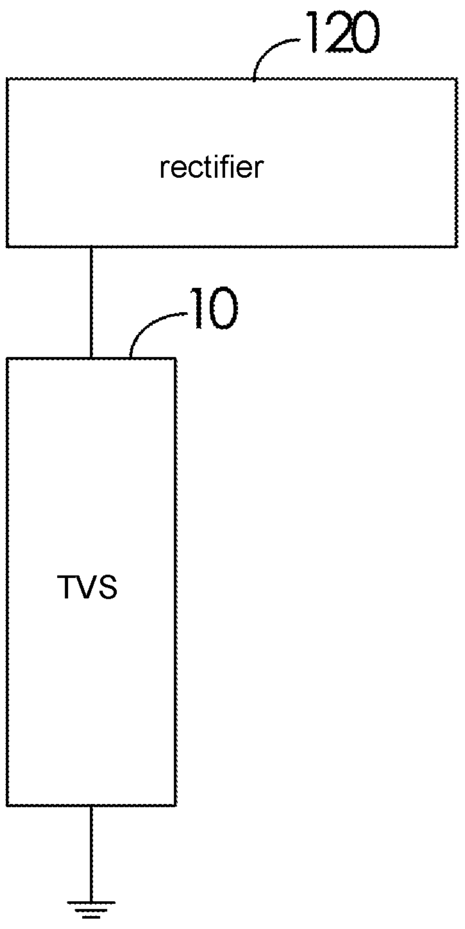
FIG. 1 illustrates a circuit structure of a lighting apparatus embodiment.

Please refer to FIG. 1

The ringing effect is typically caused by various factors related to the LED driver circuit and the electrical characteristics of the LED itself. One of the main culprits is an improperly designed LED driver circuit that fails to provide stable and consistent current and voltage to the LED. When the driver circuit does not adequately filter the output, it can lead to rapid fluctuations in the LED's current, resulting in the ringing effect.

In addition to the driver circuit, inductive and capacitive effects within the LED driver circuit can contribute to the ringing issue. Inductive components like coils and transformers can cause sudden changes in current and magnetic fields, inducing unwanted oscillations. Similarly, capacitors can charge and discharge rapidly, creating fluctuations in the LED's current and voltage, contributing to the ringing effect.

Furthermore, if the LED driver circuit uses switching components such as transistors, their switching actions can generate transients or spikes in the circuit, leading to the ringing effect. Electromagnetic interference (EMI) or radio frequency interference (RFI) from other electronic components in the vicinity can also impact the LED driver circuit and cause fluctuations in the LED's illumination.

To mitigate the ringing effect in LED light devices, careful design considerations are essential. Employing high-quality LED driver circuits with proper filtering and component selection is crucial. Proper grounding techniques and attention to the electrical system's characteristics can help reduce EMI/RFI interference and stabilize the LED's performance. Compliance with relevant electrical and lighting standards is also important to ensure LED devices provide stable and flicker-free illumination, promoting a comfortable and safe lighting experience for users.

In some embodiments, the oscillation wave removal circuit includes multiple wave filters coupled in parallel.

Figure 8:
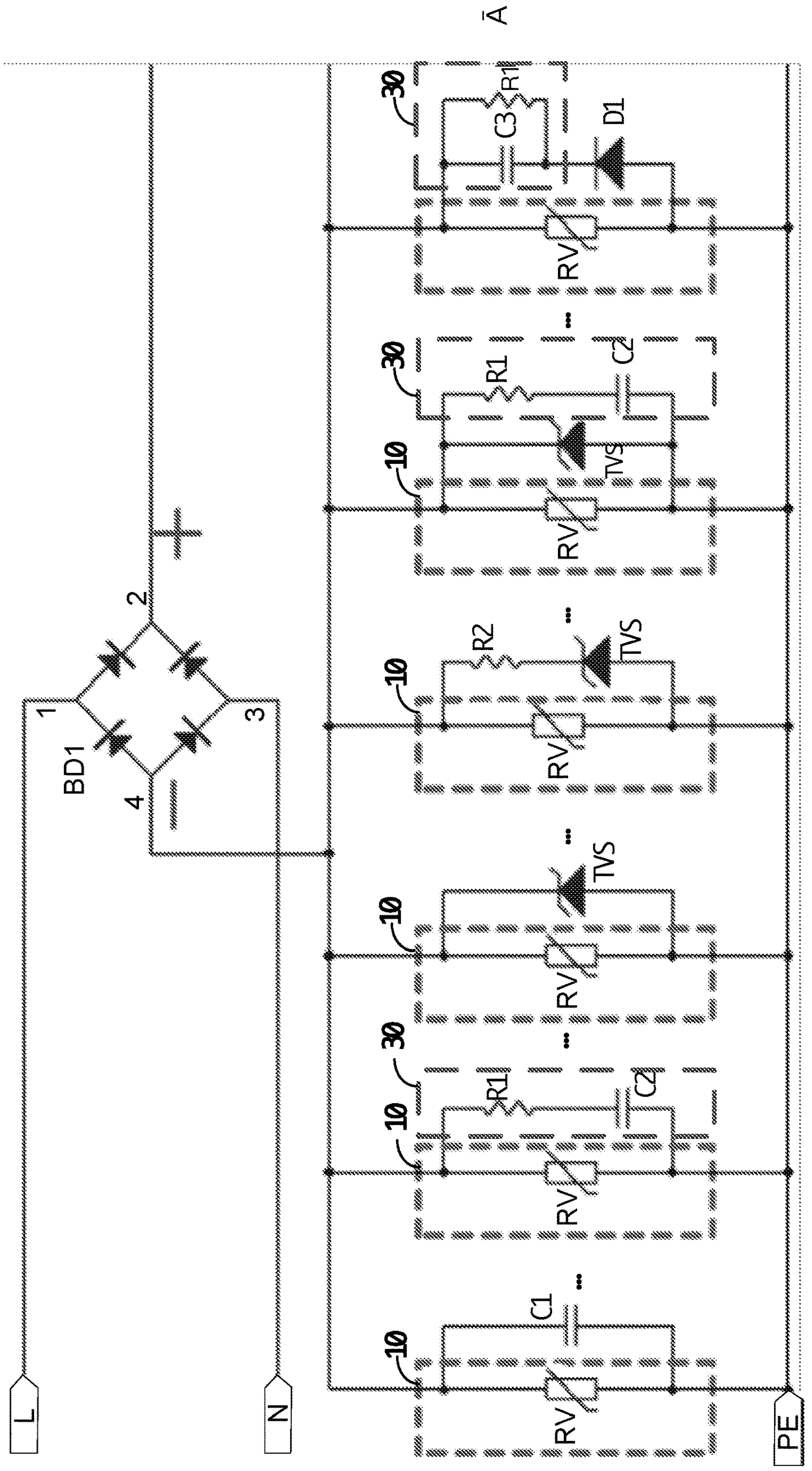
FIG. 8 illustrates multiple suppression circuit modules connected in parallel.

FIG. 8 shows such an example. The oscillation wave removal circuit includes multiple wave filters coupled in parallel. In the example of FIG. 8, each wave filter has a RV (Varistor) part and an absorbing part 30, which may include a RC (Resistor-Capacitor) module.

In some embodiments, at least two of the wave filters are assigned to filter different wave segments, so as to absorb undesired electrical waves in different ranges.

Figure 5:
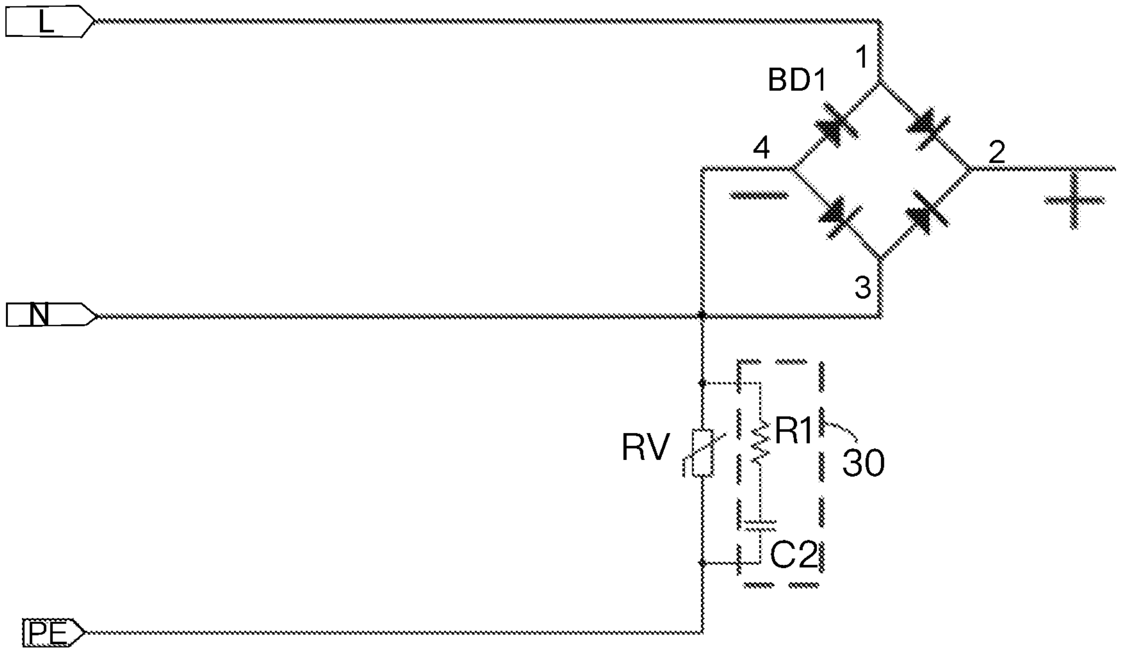
FIG. 5 illustrates another circuit block in a lighting apparatus embodiment.

In FIG. 5, at least one of the wave filter is composed of a resistor R1, a capacitor C2 and a transient voltage suppressor RV.

A transient voltage suppressor (TVS) is a type of electronic device used to protect sensitive electronic circuits from transient voltage events, such as voltage spikes and surges. These transient events can occur due to lightning strikes, electrostatic discharge (ESD), power grid switching, or other sudden changes in the electrical environment. TVS devices are commonly used to safeguard electronic components, such as diodes, integrated circuits, and semiconductor devices, from damage caused by these voltage transients.

The main purpose of a TVS is to limit the voltage that is applied to the protected circuit during transient events. It does this by rapidly and effectively clamping the voltage to a safe level, diverting the excess current away from the sensitive components. When a transient voltage exceeds the predefined threshold, the TVS activates and creates a low-resistance path, allowing the excess current to flow through it and bypassing the protected circuit. Once the transient event subsides, the TVS returns to its high-impedance state, allowing the normal operation of the protected circuit to resume.

In FIG. 8, at least one of the wave filter, e.g. the wave filter 307, is composed of a resistor R1, a capacitor C3, a diode D1 and a transient voltage suppressor RV.

In some embodiments, wherein the transient voltage suppressor comprises a p-n junction heavily doped to achieve a desired low breakdown voltage lower than 10 V so that the concentration of dopant atoms in the p and n regions is intentionally increased resulting in a thinner depletion region at the p-n junction.

In some embodiments, when a transient voltage spike occurs and the voltage across the transient voltage suppressor exceeds a breakdown voltage, the transient voltage suppressor enters the breakdown region, and its resistance drops significantly In some embodiments, the transient voltage suppressor enters the breakeven region less than 1 ms. The parameter may be adjusted by calculating electronic formula for parameters of components to achieve the goal of less than 1 ms. Engineers in the filed know how to calculate the formula and choose proper components to achieve such task. With such feature, the wave filter works only for a short period of time, instead of being enabled all the time that may cause some derivation problem.

Figure 13:
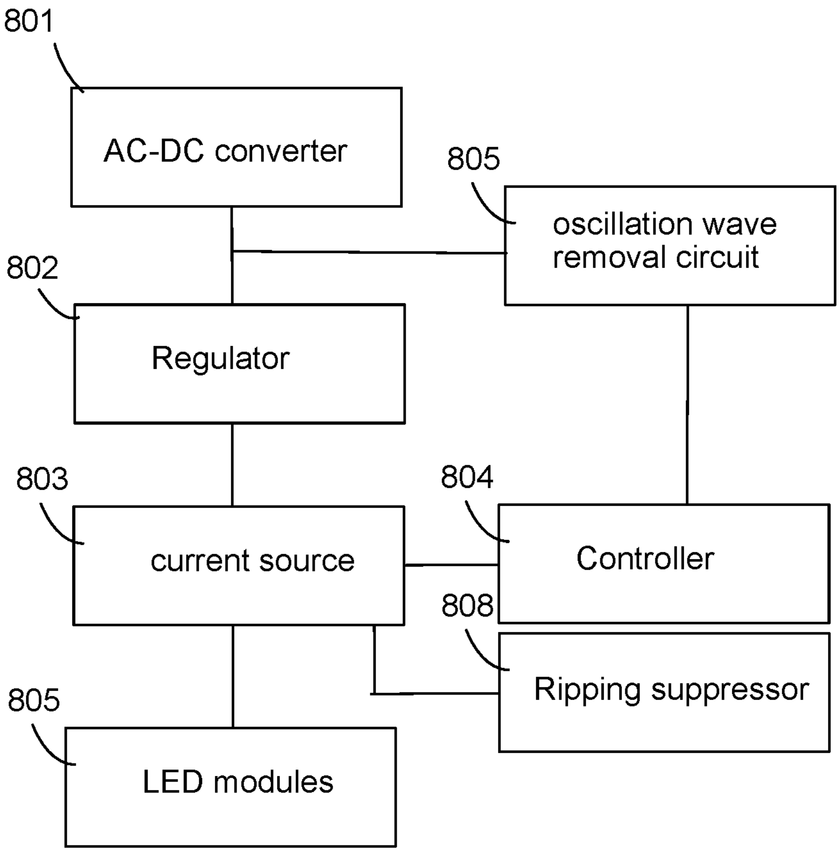
FIG. 13 shows a structure of components in a lighting apparatus embodiment.

In FIG. 13, the lighting apparatus may also include a ripping suppressor 808 for removing another type of ripping wave caused by the current source 803.

The ripping suppressor 808 is coupled to an output of the current source 803 to remove a ripping wave in the driving currents supplied to the LED modules 805.

In some embodiments, the controller 80 waits for a predetermined period every time when the driver module is initialized before adjusting a mixed color temperature of the LED modules.

In some embodiments, the controller 804 selectively enables the oscillation wave removal circuit 805.

In some embodiments, abnormal statistics of the sudden abnormal voltage peak is recorded by the controller 804 for dynamically generating a removal schedule for enabling the oscillation wave removal circuit 805 by analyzing the recorded abnormal statistics.

For example, the abnormal cases are collected by recording when the abnormal cases appear and how to set the configuration to remove such oscillation waves to obtain an optimized effect. Such statistics data are collected by the controller 804 so as to dynamically control the operation of the oscillation wave removal circuit 805.

In FIG. 11, the driver module 603 is placed in a central area of the light source plate.

The multiple LED modules 602 are placed in peripheral areas of the light source plate.

In some embodiments, two power wires are coupled to the AC-DC converter for providing an AC power source.

Figure 6:
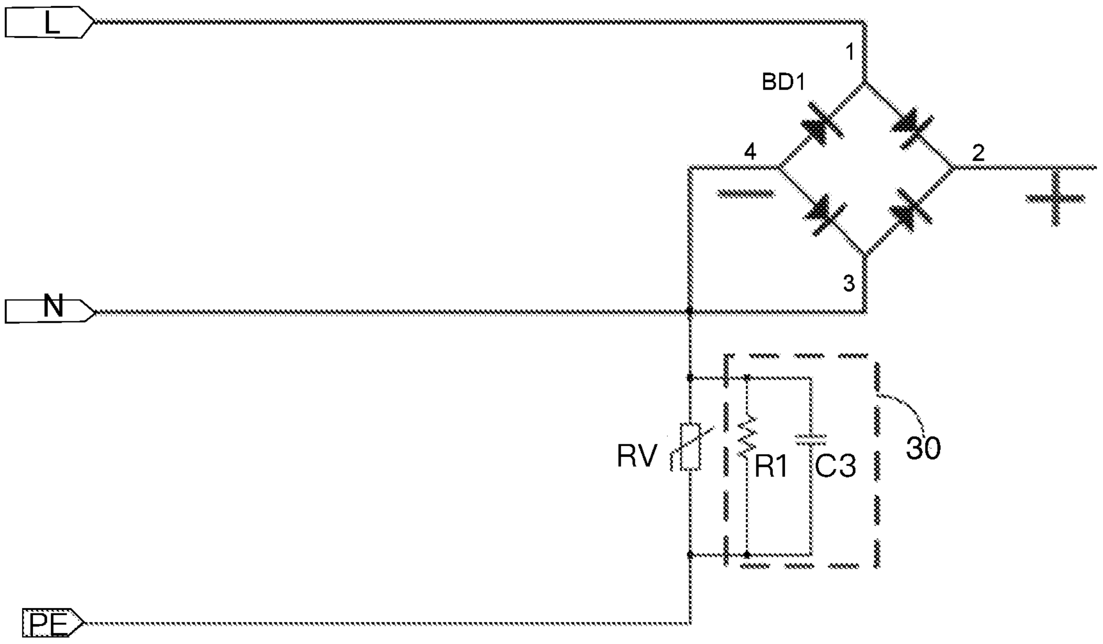
FIG. 6 illustrates another circuit block in a lighting apparatus embodiment.

FIG. 6 shows two power wires L and N coupled to a driver module for bringing external AC power to the lighting apparatus.

In some embodiments, a phase angle between the two power wires (L, N) are 90 degrees.

In some embodiments, a phase angle between the two power wires (L, N) are 270 degrees.

FIG. 6 also shows a PE (protective Earth) terminal. PE is an important safety feature in electrical systems and electronic devices. It refers to the intentional connection of conductive parts of electrical equipment and appliances to the Earth's conductive surface, typically through a grounding wire or conductor.

The primary purpose of Protective Earth is to ensure safety by providing a low-resistance path for fault currents to flow to the ground. In the event of a fault, such as a short circuit or insulation failure, current may flow through unintended conductive parts of the equipment, creating an electric shock hazard to users or causing damage to the device. By connecting these conductive parts to the Earth, any fault current is diverted safely away from users, reducing the risk of electrical shock.

In some embodiments, the substrate layer is connected to an earth protective terminal.

A phase angle between the earth protective terminal and one of the power wire is 90 degrees.

In some embodiments, the current source is a linear current regulator.

In FIG. 12, there is a path 708 for conducting heat of the current source to the substrate layer 703. Such path 708 may be made of metal material and may be variable forms, shapes and sizes for performing heat dissipation. The substrate layer 703 is a nice heat dissipation component for carrying out heat generated by the driver module.

FIG. 1 shows a lighting apparatus embodiment. In FIG. 1, a transient voltage suppressor (TVS) 10 and a rectifier 120 are connected so that the TVS 10 removes certain undesired peak current and/or voltage not handled by the rectifier 120.

Figure 2:
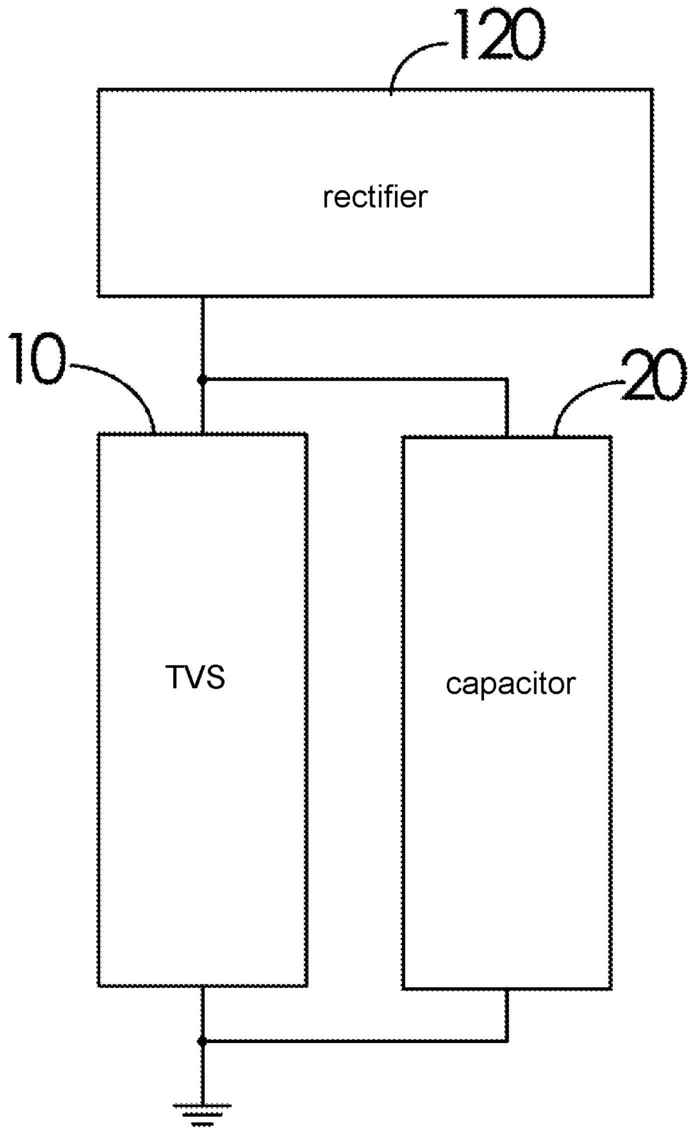
FIG. 2 illustrates another lighting apparatus embodiment.

FIG. 2 shows a different embodiment unlike FIG. 1. In addition to the rectifier 120 and the TVS 10, there is an additional capacitor 20 incorporated to increase additional bank storage for removing undesired voltage and currents.

Figure 3:
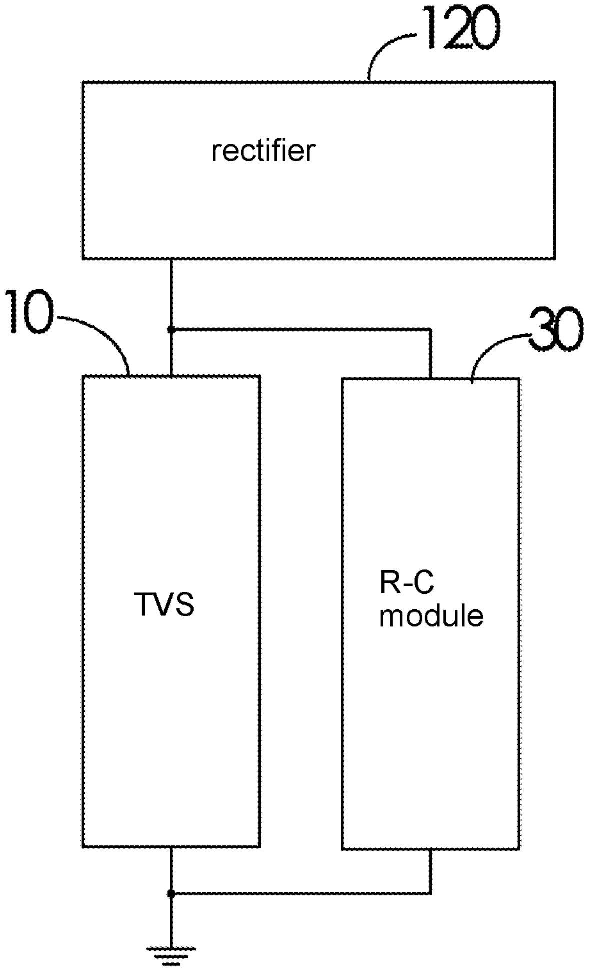
FIG. 3 illustrates another lighting apparatus embodiment.

FIG. 3 shows a different embodiment of FIG. 2. In FIG. 3, unlike using only a capacitor, in addition to the rectifier 120 and the TVS 10, there is a R-C module that are used for absorbing the undesired voltage and current.

Figure 4:
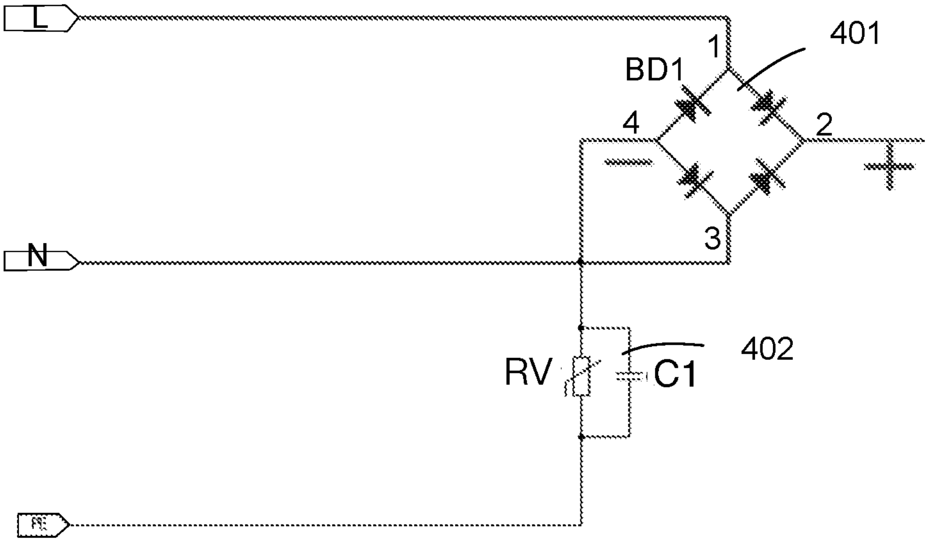
FIG. 4 illustrates a circuit block in a lighting apparatus embodiment.

FIG. 4 shows a bridge circuit 401 which is coupled to an oscillation wave removal circuit 402.

FIG. 5 shows using an RC module 30 in the oscillation wave removal circuit.

FIG. 6 shows using another RC module 30 in the oscillation wave removal circuit.

Figure 7:
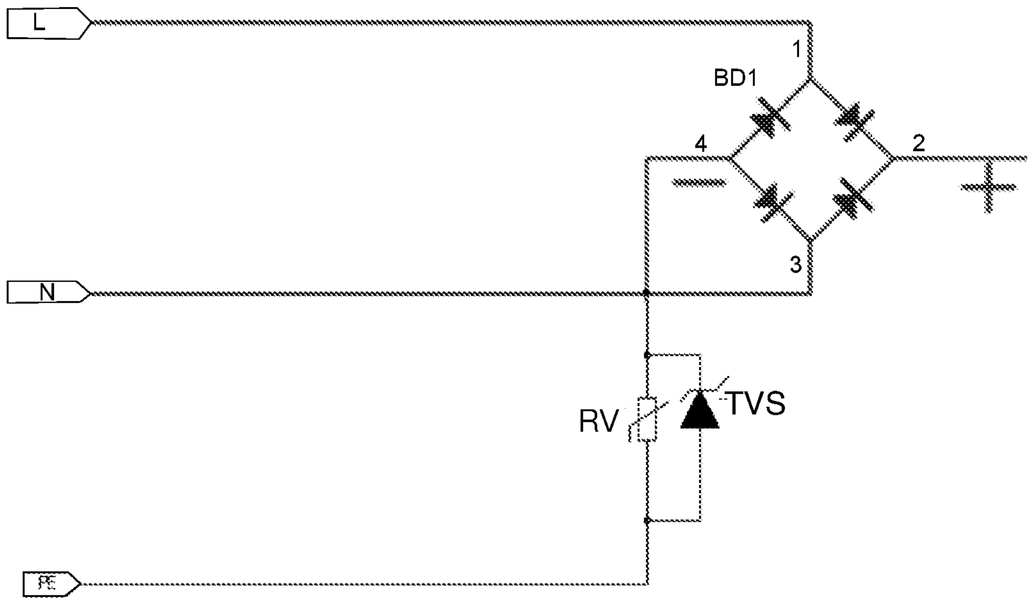
FIG. 7 illustrates another circuit block in a lighting apparatus embodiment.

FIG. 7 shows another kind of oscillation wave removal circuit that includes a TVS and a RV.

FIG. 8 shows multiple wave filters are connected in parallel for removing undesired voltage and currents form the bridge circuit.

Figure 9:
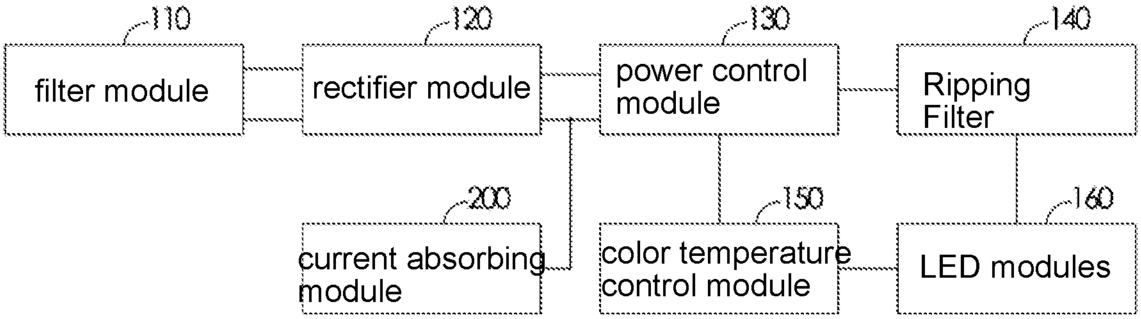
FIG. 9 illustrates a architecture diagram of a lighting apparatus embodiment.

FIG. 9 shows a lighting apparatus embodiment.

In FIG. 9, the lighting apparatus includes a filter module 110, a rectifier module 120 for converting AC to DC, a power control module 130 as a current source for generating driving currents, a ripping filter 140 for removing ripping noise, a current absorbing module 200 for removing undesired voltage or current mentioned above, a color temperature control module 150 for sending control signals to the power control module 130 to generate different driving currents to the LED modules 160 based on different color temperature settings.

Figure 10:
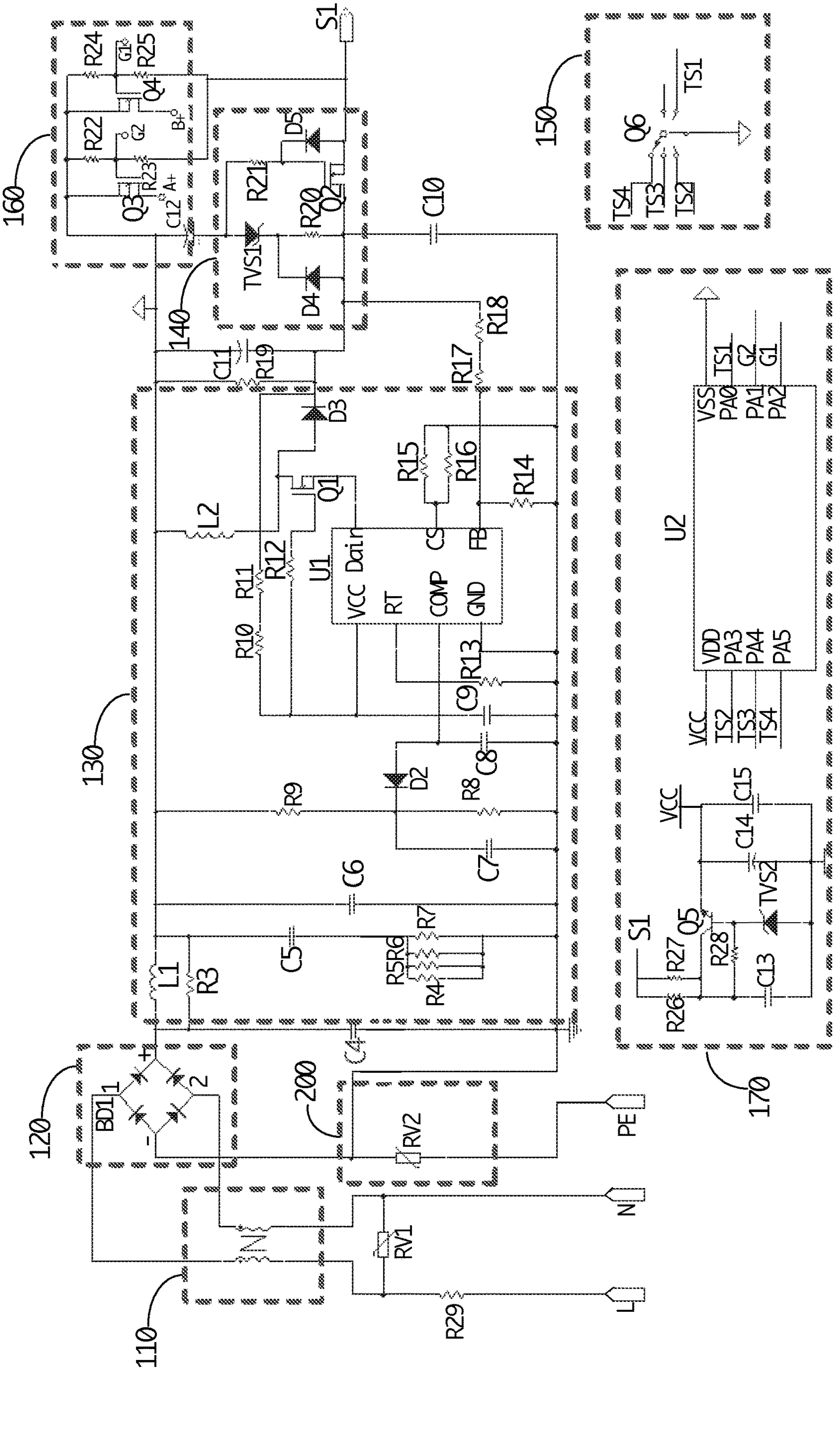
FIG. 10 illustrates a detailed circuit example of the lighting apparatus embodiment.

FIG. 10 shows a detailed circuit example to implement the filter module 110, the rectifier module 120 for converting AC to DC, the power control module 130 as a current source for generating driving currents, the ripping filter 140 for removing ripping noise, the current absorbing module 200, the color temperature control module 150, the controller 170 and the LED modules 160.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source plate comprising a substrate layer, a wiring layer and a protection layer, wherein the substrate layer is made of metal material, wherein a thickness of substrate layer is larger than ten times a total thickness of the wiring layer and the protection layer;

LED modules disposed on a top side of the light source plate; and a driver module disposed on the top side of the light source plate, wherein the LED modules and the driver module are electrically connected via the wiring layer, wherein the driver module comprises an AC-DC converter, a regulator, a controller, a current source and an oscillation wave removal circuit, wherein the controller controls the current source to generate driving currents to the LED modules, wherein the oscillation wave removal circuit is coupled to the AC-DC converter for suppressing a sudden abnormal peak voltage from the AC-DC converter.

2. The lighting apparatus of claim 1, wherein the sudden abnormal peak voltage is an oscillation wave caused by a leakage current from the substrate layer.

3. The lighting apparatus of claim 2, wherein the substrate layer is used as a ground for coupling to the driver module.

4. The lighting apparatus of claim 1, wherein the oscillation wave removal comprises multiple wave filters coupled in parallel.

5. The lighting apparatus of claim 4, wherein at least two of the wave filters are assigned to filter different wave segments.

6. The lighting apparatus of claim 4, wherein at least one of the wave filter is composed of a resistor, a capacitor and a transient voltage suppressor.

7. The lighting apparatus of claim 4, wherein at least one of the wave filter is composed of a resistor, a capacitor, a diode and a transient voltage suppressor.

8. The lighting apparatus of claim 7, wherein the transient voltage suppressor comprises a p-n junction heavily doped to achieve a desired low breakdown voltage lower than 10 V so that the concentration of dopant atoms in the p and n regions is intentionally increased resulting in a thinner depletion region at the p-n junction.

9. The lighting apparatus of claim 8, wherein when a transient voltage spike occurs and the voltage across the transient voltage suppressor exceeds a breakdown voltage, the transient voltage suppressor enters the breakdown region, and its resistance drops significantly.

10. The lighting apparatus of claim 9, wherein the transient voltage suppressor enters the breakeven region less than 1 ms.

11. The lighting apparatus of claim 1, further comprising a ripping suppressor, wherein the ripping suppressor is coupled to an output of the current source to remove a ripping wave in the driving currents supplied to the LED modules.

12. The lighting apparatus of claim 1, wherein the controller waits for a predetermined period every time when the driver module is initialized before adjusting a mixed color temperature of the LED modules.

13. The lighting apparatus of claim 1, wherein the controller selectively enables the oscillation wave removal circuit.

14. The lighting apparatus of claim 13, wherein abnormal statistics of the sudden abnormal voltage peak is recorded by the controller for dynamically generating a removal schedule for enabling the oscillation wave removal circuit by analyzing the recorded abnormal statistics.

15. The lighting apparatus of claim 1, wherein the driver module is placed in a central area of the light source plate, wherein the multiple LED modules are placed in peripheral areas of the light source plate.

16. The lighting apparatus of claim 1, wherein two power wires are coupled to the AC-DC converter for providing an AC power source.

17. The lighting apparatus of claim 16, wherein a phase angle between the two power wires are 90 degrees.

18. The lighting apparatus of claim 16, wherein a phase angle between the two power wires are 270 degrees.

19. The lighting apparatus of claim 16, wherein the substrate layer is connected to an earth protective terminal, wherein a phase angle between the earth protective terminal and one of the power wire is 90 degrees.

20. The lighting apparatus of claim 1, wherein the current source is a linear current regulator, wherein there is a path for conducting heat of the current source to the substrate layer.

* * * * *